United States Patent Office 3,479,321
Patented Nov. 18, 1969

3,479,321
NITRATED POLYESTERS AND POLYBENZOX-
AZOLES PREPARED FROM SAME
Leo R. Belohlav, Berkeley Heights, and John R. Costanza, Plainfield, N.J., assignors to Celanese Corporation, New York, N.Y., a corporation of Delaware
No Drawing. Filed Oct. 19, 1966, Ser. No. 587,702
Int. Cl. C08g 33/02, 23/20
U.S. Cl. 260—47                                         17 Claims

ABSTRACT OF THE DISCLOSURE

A process is provided for the efficient production of polybenzoxazoles which utilizes a novel class of nitrated polyester intermediates. Certain bisphenols are condensed with certain aromatic dicarboxy compounds to form a polyester, the polyester is nitrated, and the nitro groups of the polyester are reduced and cyclized to form a polybenzoxazole. Fabricated articles can be formed from either the nitrated polyester intermediate or the resulting polybenzoxazole.

---

This invention relates to a novel and comparatively inexpensive process for the production of polybenzoxazoles of high purity. It also relates to a new class of intermediates and also to new polybenzoxazoles species, both groups of which are capable of fiber-formation.

Polybenzoxazoles are a relatively new class of heterocyclic polymers having high performance characteristics. Descriptions of their properties and previous methods of preparation appear in U.S. Patents 2,904,537 and 3,230,-196. They may be fabricated into molded objects, coatings, fibers and films which show great resistance to degradation by heat, hydrolytic media, oxidizing media and other deleterious environmental effects.

However two factors which seriously limit the full commercial exploitation of polybenzoxazoles are their high cost and impure state. High purity is particularly important for good fiber production. The polybenzoxazoles have heretofore been prepared as described in the above patents by the condensation polymerization between a bis(o-amino-phenol) and an aromatic dicarboxylic acid or derivative thereof. Bis(o-amino-phenols) are expensive starting materials, and, to a much greater extent than the monofunctional aromatic amines, are highly oxidation sensitive. Thus, the polymerization step involving these sensitive starting materials requires special precautions.

It is an object of this invention to prepare polybenzoxazoles in an inexpensive manner and in a pure state. More particularly it is a object to prepare polybenzoxazoles avoiding the use of bis(o-amino-phenol) starting materials, and further, avoiding the presence of any mono- or difunctional aromatic amine for any significant time during the preparation. Still further it is an object to produce new polybenzoxazoles which are capable of fiber formation.

These objects have now been realized by the method of this invention which broadly comprises the steps of condensing a bisphenol with an aromatic dicarboxy compound to yield a polyester, nitrating the polyester, reducing the nitro groups to amino groups and simultaneously cyclizing the polymer to yield the desired polybenzoxazole.

We have found that, under certain conditions, these aromatic polyesters can be stoichiometrically nitrated with minimum degradation. Further we have found that both the reduction of the nitrated polymer to the amine and the thermal ring closure can be so conducted such as to proceed quantitatively and essentially simultaneously thus avoiding oxidation sensitive intermediates.

The polybenzoxazoles which can be prepared by the method of this invention have recurring units of the formulae:

(1)

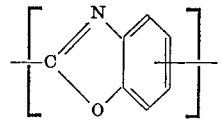

(2)

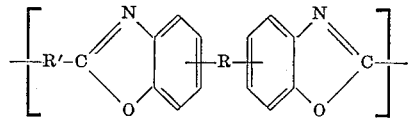

wherein R is a bivalent radical or a carbon-to-carbon bond and R' is an arylene radical. Examples of R include alkylene, phenylene, —SO$_2$—, —CO— and the like.

Bisphenol compounds suitable as starting material for the practice of this invention are those having the formula HO—Ar—OH and HO—Ar—R—Ar—OH wherein Ar is arylene radical and R is a carbon-to-carbon linkage or a bivalent radical such as alkylene, phenylene, —SO$_2$—, —CO— and the like. These bisphenols have at least one position ortho to each phenolic group amenable to electrophilic substitution and such structure as to be nitratable only in positions ortho to the phenolic groups.

Preferred bisphenol compounds are those wherein Ar is phenylene. Exemplary of these are resorcinol and 2,2-bis (p-hydroxyphenyl) propane, and 4,4'-dihydroxyphenyl.

Aromatic dicarboxy compounds suitable as starting materials for the practice of this invention are those having the formula:

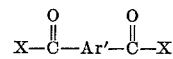

where Ar' is an arylene radical and X is halide, or —OR wherein R is H, a monovalent aliphatic or aromatic hydrocarbon radical, or an alkali metal. The preferred halides are chloride and bromide. The preferred group when R is a monovalent hydrocarbon radical is phenyl, and less preferably methyl. Overall, the preferred X is chloride or bromide. The preferred aromatic dicarboxy compounds are isophthaloyl chloride and terephthaloyl chloride.

The polyester formed upon the condensation polymerization of these reactants has at least one position ortho to each phenolic ester linkage amenable to electrophilic substitution and such structure as to block the introduction of nitro-groups into positions other than ortho to the phenolic ester linkage. The polyester has recurring units that can be represented by the formula:

(4)

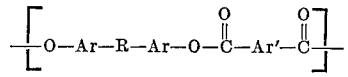

wherein Ar, Ar' and R have the above significance.

The nitrated polyesters of this invention have recurring units of the formula:

(5)

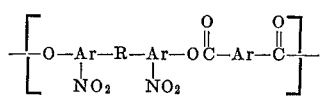

wherein Ar, Ar' and R have the above significance and the nitro groups are ortho to the phenolic ester linkage.

When Ar and Ar' are phenylene, the nitrated polyesters have the formula:

(6)

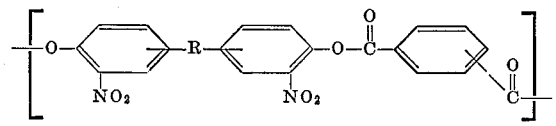

wherein R has the above significance.

These nitrated polyesters are useful not only as intermediates in the production of polybenzoxazoles as described herein but can themselves be fabricated into useful articles. Fibers can be formed from these nitrated polyesters which are detonatable. Thus they can serve wherever detonatable fibers are useful, i.e. as solid propellants either alone or in reinforcing other solid propellants. Further such fibers may be added to a matrix of a material such as cement and upon solidification of the matrix the fibers can be detonated as by heating to yield a voidy structure.

The novel fiber-forming polybenzoxazoles of this invention have recurring units of the formula:

(3)

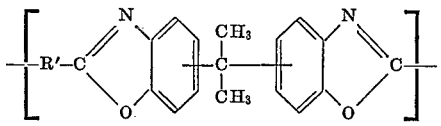

wherein R' is an arylene radical. In the species whose preparation is illustrated in Examples I to III below, R' is m-phenylene.

The formation of the polyester by condensation polymerization may be carried out either homogeneously or heterogeneously employing conventional polymerization techniques well known to those skilled in the art. A preferred method is interfacial polycondensation. The following example illustrates a preferred embodiment of this latter method:

EXAMPLE I

A solution of 45.60 grams of Bisphenol A (2,2-bis (p-hydroxyphenyl) propane) and 16.0 grams of sodium hydroxide in 300 ml. of water is prepared and poured into a blender. A solution of 12.0 grams of sodium lauryl sulfate in 120 ml. of water is added to the solution under slow agitation. A solution of 40.32 grams of isophthaloyl chloride in 600 ml. of toluene is quickly added under rapid agitation. After five minutes of reaction the contents of the blender are poured into 500 ml. of acetone to precipitate the polymer. The precipitated polymer is washed several times with hot water to remove the sodium lauryl sulfate and sodium chloride. The polymer is dried at 120° C. in a vacuum oven to a constant weight. A 90% yield of white polymer with an I.V. of 1.8 (in 1:1 phenol: tetrachlorethane) is obtained. The polymer softens at 280° C.

The polyester intermediate is then nitrated so as to introduce two nitro groups per monomeric unit in ring positions ortho to the ester group with a minimum of chain degradation. A suitable and inexpensive nitrating agent for this purpose is fuming nitric acid. The polyester can be reacted with the fuming nitric acid directly or it can be dissolved in a suitable solvent such as a chlorinated hydrocarbon, e.g. tetrachloroethane. Nitronium ion salts such as $NO_2^+$ $BF_4^-$ can be used but are comparatively too expensive. The standard nitrating combination of nitric acid and sulfuric acid should not be employed since extensive chain degradation occurs resulting in a low polymer I.V. and additionally incomplete nitration. The following example illustrates a preferred embodiment of this step.

EXAMPLE II

Ten grams of the polyester prepared in Example I are slowly dissolved in 100 ml. of fuming nitric acid (d.=1.5) at —10° C. while maintaining the temperature between —10° C. and +5° C. The clear solution is poured into 500 ml. of ice water with rapid stirring. The precipitated polymer is filtered and washed with distilled water until it is neutral. The polymer is dried at 120° C. in a vacuum oven to a constant weight. A 95% yield of yellow polymer with an I.V. of 0.7 (in 1:1 phenol: tetrachlorethane) is obtained. Acid hydrolysis of the polymer results in 2,2-bis (3-nitro-4-hydroxyphenyl) propane. Quantitative hydrogenation indicates that the nitro group content of the polymer corresponds to two nitro groups per repeating polymer unit as expected theoretically. Infrared analysis confirms the presence of nitro substitution ortho to the ester groups in the polymer. Elemental analysis of the polymer produced the following results. Calculated for $C_{23}H_{16}N_2O_8$: C, 61.61; H, 3.60; N, 6.25. Found: C, 61.1; H, 3.76; N, 6.23.

The reduction of the nitrated polyester should be conducted in an acid medium. Catalytic hydrogenation of the nitrated polyester in a suitable solvent such as dimethylacetamide or dimethylformamide over a platinum oxide or palladium catalyst, for example, will result in the formation of the aminated polyester. The latter, being an aromatic amine, is sensitive to oxidation. Thus, although the aminated polyester can be cyclized as by acidifying with hydrochloric acid and heating to reflux, it is not a desirable route since the product is less pure. Rather the reduction is preferably conducted employing an oxidizable transition metal or compound thereof and hydrochloric acid. These reducing agents will directly yield polybenzoxazoles from the nitrated polyesters. Two convenient catalyst systems are stannous chloride and hydrochloric acid and iron powder and hydrochloric acid, the latter system being preferred. The nitrated polyester is preferably dissolved in a suitable solvent such as dimethylformamide or dimethylacetamide.

The following example illustrates the simultaneous reduction and cyclization of the nitrated polyester.

EXAMPLE III

Twelve grams of the nitrated polyester prepared as in Example II are dissolved in 250 ml. of dimethylformamide. Thirty grams of iron powder are added followed by incremental addition of 20 ml. of concentrated hydrochloric acid. The mixture is refluxed for two hours under nitrogen, cooled to room temperature and filtered. One hundred milliliters of 20% hydrochloric acid are added to the filtrate to precipitate the polymer. The polymer is redissolved in dimethylformamide and reprecipitated with 20% hydrochloric acid. The polymer is washed with water until it is neutral and then dried at 120° C. in a vacuum oven to a constant weight. An 80% yield of polybenzoxazole with an I.V. of 0.6 (in 1:1 phenol: tetrachloroethane) is obtained. The polymer softens at 270° C. and melts at 300° C. Infrared absorption is compatible with the absence of nitro and carboxyl groups and indicates the presence of benzoxazole rings. Elemental analysis of the polymer produced the following results. Calculated for $C_{23}H_{16}N_2O_2$: C, 78.39; H, 4.58. Found: C, 77.5; H, 5.12. This corresponds to a polybenzoxazole having recurring units of the formula:

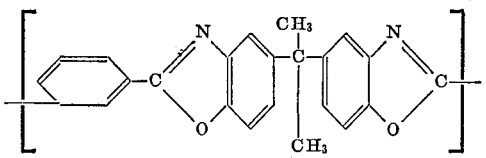

The polybenzoxazole produced in Example III was melt spun at a temperature range of 263–300° C. (263° C. was the initial extrusion temperature) to produce a coherent fiber having a golden brown color. Fibers can also be prepared from this polybenzoxazole by dry spinning from a suitable solvent such as dimethylformamide or dimethylacetamide. In contrast thereto the polybenzoxazole wherein R in the above Formula 2 is a carbon-to-carbon bond cannot be melt spun. Also it is not soluble in dimethylformamide or dimethylacetamide.

Films can also be produced from this polybenzoxazole as, for example, by evaporation of a solution of the polymer in dimethylacetamide.

Articles fabricated from these polybenzoxazoles can be thermoset by heating in contact with transition metal salts such as ferric chloride or stannous chloride.

Thus, by the reaction sequence of this invention one can simply and inexpensively prepare polybenzoxazoles.

Numerous variations and alternative means to accomplish the several steps of this process within the spirit of the present invention will be apparent to one skilled in the art.

What is claimed is:

1. A nitrated fiber forming polyester consisting essentially of recurring units of the formula:

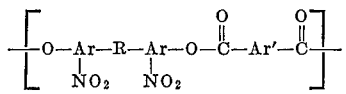

wherein Ar and Ar' are arylene radicals and R is selected from the group consisting of a carbon-to-carbon linkage, alkylene, phenylene, —SO$_2$—, and —CO—; and the nitro groups are in the ortho position relative to the phenolic ester linkage.

2. A nitrated polyester according to claim 1 wherein Ar and Ar' are phenylene.

3. A nitrated polyester according to claim 2 wherein R is isopropylidene.

4. A process for preparing a nitrated fiber forming polyester consisting essentially of recurring units of the formula:

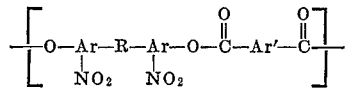

comprising the steps of
   (a) reacting (1) a bisphenol selected from the group consisting of HO—Ar—OH and HO—Ar—R—Ar—OH wherein Ar is arylene radical and R is selected from the group consisting of carbon-to-carbon linkage, alkylene, phenylene, —SO$_2$— and —CO— with
   (2) an aromatic dicarboxy compound of the formula:

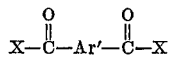

wherein Ar' is an arylene radical and X is selected from the group consisting of halide and —OR' wherein R' is selected from the group consisting of hydrogen, a monovalent aliphatic or aromatic radical and an alkali metal to form a polyester and
   (b) nitrating said polyester to such an extent as to introduce one nitro group ortho to each phenolic ester linkage.

5. A process according to claim 4 wherein Ar and Ar' are phenylene.

6. A process according to claim 5 wherein R is isopropylidene.

7. A process according to claim 8 wherein the nitration step is effected with fuming nitric acid.

8. A process for the preparation of polybenzoxazoles comprising the steps of
   (a) reacting (1) bisphenol selected from the group consisting of HO—Ar—OH and HO—Ar—R—Ar—OH wherein Ar is arylene radical and R is selected from the group consisting of carbon-to-carbon linkage, alkylene, phenylene, —SO$_2$— and —CO— with (2) an aromatic dicarboxy compound of the formula:

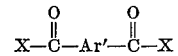

wherein Ar' is an arylene radical and X is selected from the group consisting of halide and —OR' wherein R' is selected from the group consisting of hydrogen, a monovalent aliphatic or aromatic radical and an alkali metal to form a polyester
   (b) nitrating said polyester to such an extent as to introduce one nitro group ortho to each phenolic ester linkage and
   (c) reacting the nitrated polyester in acid medium with a reducing agent to reduce and cyclize the nitrated polyester to polybenzoxazole.

9. A process according to claim 8 wherein Ar and Ar' are phenylene.

10. A process according to claim 8 wherein R is alkylene.

11. A process according to claim 8 wherein R is isopropylidene.

12. A process according to claim 8 wherein X is chloride.

13. A process according to claim 8 wherein the reactants in step (a) are in different phases.

14. A process according to claim 8 wherein the nitration step is effected with fuming nitric acid.

15. A process according to claim 8 wherein the acid medium in step (c) contains hydrochloric acid.

16. A process according to claim 15 wherein the reducing agent is iron.

17. A process according to claim 15 wherein the reducing agent is stannous chloride.

References Cited

UNITED STATES PATENTS 3,306,876  2/1967  Kantor et al. _____ 260—47

WILLIAM H. SHORT, Primary Examiner

L. L. LEE, Assistant Examiner

U.S. Cl. X.R.

260—32.6